US011049106B2

(12) United States Patent
van der Laak et al.

(10) Patent No.: US 11,049,106 B2
(45) Date of Patent: Jun. 29, 2021

(54) APPARATUS, SYSTEMS, AND METHODS FOR AUTHORIZATION OF ELECTRONIC TRANSACTIONS BASED ON SECURED ZONES

(71) Applicant: Conax Technology AS, Gjettum (NO)

(72) Inventors: Frode van der Laak, Gjettum (NO); Zane Dawood, Toronto (CA)

(73) Assignee: Conax Group AB (publ), Stockholm (SE)

( * ) Notice: Subject to any disclaimer, the term of this patent is extended or adjusted under 35 U.S.C. 154(b) by 0 days.

(21) Appl. No.: 16/721,858

(22) Filed: Dec. 19, 2019

(65) Prior Publication Data

US 2020/0126078 A1    Apr. 23, 2020

Related U.S. Application Data

(63) Continuation-in-part of application No. 16/660,759, filed on Oct. 22, 2019.

(60) Provisional application No. 62/749,649, filed on Oct. 23, 2018.

(51) Int. Cl.
| | | |
|---|---|---|
| *G06Q 20/40* | (2012.01) | |
| *G06Q 20/20* | (2012.01) | |
| *G06Q 20/10* | (2012.01) | |

(52) U.S. Cl.
CPC ....... *G06Q 20/401* (2013.01); *G06Q 20/1085* (2013.01); *G06Q 20/20* (2013.01); *G06Q 20/4015* (2020.05)

(58) Field of Classification Search
CPC ... G06Q 20/401; G06Q 20/4015; G06Q 20/20
See application file for complete search history.

(56) References Cited

U.S. PATENT DOCUMENTS

| 10,325,428 B1* | 6/2019 | Kurian | ............ G07C 9/28 |
|---|---|---|---|
| 2010/0332339 A1 | 12/2010 | Patel et al. | |
| 2013/0030931 A1* | 1/2013 | Moshfeghi | ............ H04W 4/80 |
| | | | 705/16 |

(Continued)

FOREIGN PATENT DOCUMENTS

CA    2992458    1/2017

OTHER PUBLICATIONS

"An Introduction to Hyperledger," The Linux Foundation, 2018, 33 pages.

(Continued)

*Primary Examiner* — A. Hunter Wilder
(74) *Attorney, Agent, or Firm* — Ellen M. Bierman; Lowe Graham Jones PLLC (57) ABSTRACT

Electronic transaction systems and methods are operable to conduct transaction verification and authorization process for an electronic transaction. An exemplary embodiment determines location of a personal electronic device of a consumer during an electronic transaction; determines location of an electronic transaction device that the consumer is using to conduct the electronic transaction; determines a distance between the personal electronic device of the consumer and the electronic transaction device; compares the determined distance with a predefined distance; and verifies and authorizes the electronic transaction when the determined distance less than or equal to the predefined distance.

16 Claims, 7 Drawing Sheets

(56) References Cited

U.S. PATENT DOCUMENTS

| | | | |
|---|---|---|---|
| 2014/0279113 A1* | 9/2014 | Balasubramanian | G06Q 20/20 705/21 |
| 2015/0287018 A1 | 10/2015 | Iqbal et al. | |
| 2016/0260068 A1 | 9/2016 | Dent | |
| 2017/0124567 A1* | 5/2017 | Henderson | G06Q 20/4014 |
| 2017/0364698 A1 | 12/2017 | Goldfarb et al. | |
| 2017/0372391 A1 | 12/2017 | Metnick et al. | |
| 2018/0234413 A1 | 8/2018 | Watanabe et al. | |
| 2020/0127844 A1 | 4/2020 | van der Laak et al. | |
| 2020/0279244 A1* | 9/2020 | Matta | G06Q 20/409 |

OTHER PUBLICATIONS

Crush Crypto Weekly, Nov. 12, 2017, 3 pages.
Highfield, V., "Bitcoin Price: This One Chart Shows Just How Volatile Bitcoin and Cryptocurrency Can Be," alphr, Sep. 5, 2017, 3 pages.
"Hyperledger-fabricdocs Documentation, Release master," hyperledger, Oct. 22, 2018, 383 pages.
International Search Report and Written Opinion of the International Searching Authority completed Jan. 27, 2020, in International Patent Application No. PCT/US19/57740, 9 pages.
International Search Report and Written Opinion of the International Searching Authority completed May 19, 2020, in International Patent Application No. PCT/US19/67685, 8 pages.
"Ledger Receive Address Attack," docdroid.net, retrieved from the Internet at LedgerReceiveAddressAttack.pdf on Jun. 29, 2020, 3 pages.
Nakamoto, S., "Bitcoin: A Peer-to-Peer Electronic Cash System," www.bitcoin.org, 2008, 9 pages.
Nova, A., "Just 8 percent of Americans are invested in cryptocurrencies, survey says," CNBC, Mar. 16, 2018, 3 pages.
Raul (ed.), "Transactions Speeds: How Do Cryptocurrencies Stack Up to Visa or PayPal?" Visualizations, howmuch.net, Jan. 10, 2018, 3 pages.
Shane, D., "$530 million cryptocurrency heist may be biggest ever," CNN Business, Jan. 29, 2018, 4 pages.
"Transaction Fees Per Transaction" charts, www.smartbit.com.au, 1 page.
"What is Blockchain Technology? A Step-by-Step Guide for Beginners," Sep. 13, 2018, retrieved from the Internet at https://blockgeeks.com/guides/what-is-blockchain-technology/ on Oct. 22, 2018, 21 pages.

* cited by examiner

APPARATUS, SYSTEMS, AND METHODS FOR AUTHORIZATION OF ELECTRONIC TRANSACTIONS BASED ON SECURED ZONES

CROSS-REFERENCE TO RELATED APPLICATIONS

This application is a continuation-in-part of U.S. patent application Ser. No. 16/660,759, filed Oct. 22, 2019, entitled "APPARATUS, SYSTEMS AND METHODS FOR STEMMED BLOCKCHAIN OPERATION WITH SECURED PARTICIPANT IDENTIFIERS," which claims the benefit of U.S. Provisional Patent Application No. 62/749,649, entitled "APPARATUS, SYSTEMS, AND METHODS FOR STEMMED BLOCKCHAIN OPERATION WITH SECURED PARTICIPANT IDENTIFIERS," filed Oct. 23, 2018; which applications are incorporated herein by reference in their entireties

BACKGROUND

Consumers are conducting electronic transactions with increasing frequency. Because of fraudulent individuals who are able to obtain financial information about the consumer and their financial accounts, the consumer is at risk for having such fraudulent individual access and steal their assets and/or personal information using fraudulent electronic transactions. Accordingly, there is a need in the arts to thwart the fraudulent individual's attempt to obtain such consumer identity and account information.

SUMMARY

Systems and methods of providing secure electronic-based transactions to a consumer are disclosed. An exemplary embodiment employs a system that compares a distance between a determined location of a personal electronic device of the consumer with the location of an electronic transaction. An example embodiment accesses a predefined distance. This predefined distance may be represented as a radius, or a secured zone, around the personal electronic device of the consumer. Then, if the determined location of the electronic transaction is within the predefined distance from (within the secured zone of) the personal electronic device of the consumer, the electronic transaction is permitted.

Alternatively, or additionally, a predefined location is associated with the predefined distance. An exemplary embodiment employs a system that compares a distance between the predefined location with the location of the electronic transaction. Then, if the determined location of the electronic transaction is within the predefined distance from (within the secured zone of) the predefined location, the electronic transaction is permitted.

In some embodiments, the predefined distance is stored securely in blockchain information that is uniquely associated with the particular consumer who is accessing their financial information to conduct an electronic transaction. Since a blockchain is not accessible by a fraudulent individual, the fraudulent individual will never have access to the predefined distance that is necessary for verification of the electronic transaction. Various other information that may be used to verify an electronic transaction may optionally be secured within the consumer's blockchain information.

The predefined distance is a variable value that can be user-defined. For example, if the consumer is travelling in a foreign country, the consumer may choose to decrease the length of the predefined distance for the duration of their travels. Thus, the consumer can feel that any electronic transactions that they perform, such as accessing an automated teller machine (ATM) for cash in the local country currency, may be performed in a secure and reliable manner. Further, in the event that their ATM card is lost or stolen, they will appreciate that their card will be impossible to use for a fraudulent electronic transaction. Further, in the event of a lost or stolen ATM card, the consumer can immediately modify the predefined distance that has been securely stored in their blockchain information to a different predefined distance, such as a few inches or feet, or even no distance. (Then, if their misplaced ATM card is later found by the consumer or if their lost ATM card is returned to the consumer, the consumer can again change and securely store the predefined distance into their secure blockchain information so that they may continue to user their ATM card.)

BRIEF DESCRIPTION OF THE DRAWINGS

Preferred and alternative embodiments are described in detail below with reference to the following drawings.

DETAILED DESCRIPTION

Figure 1:
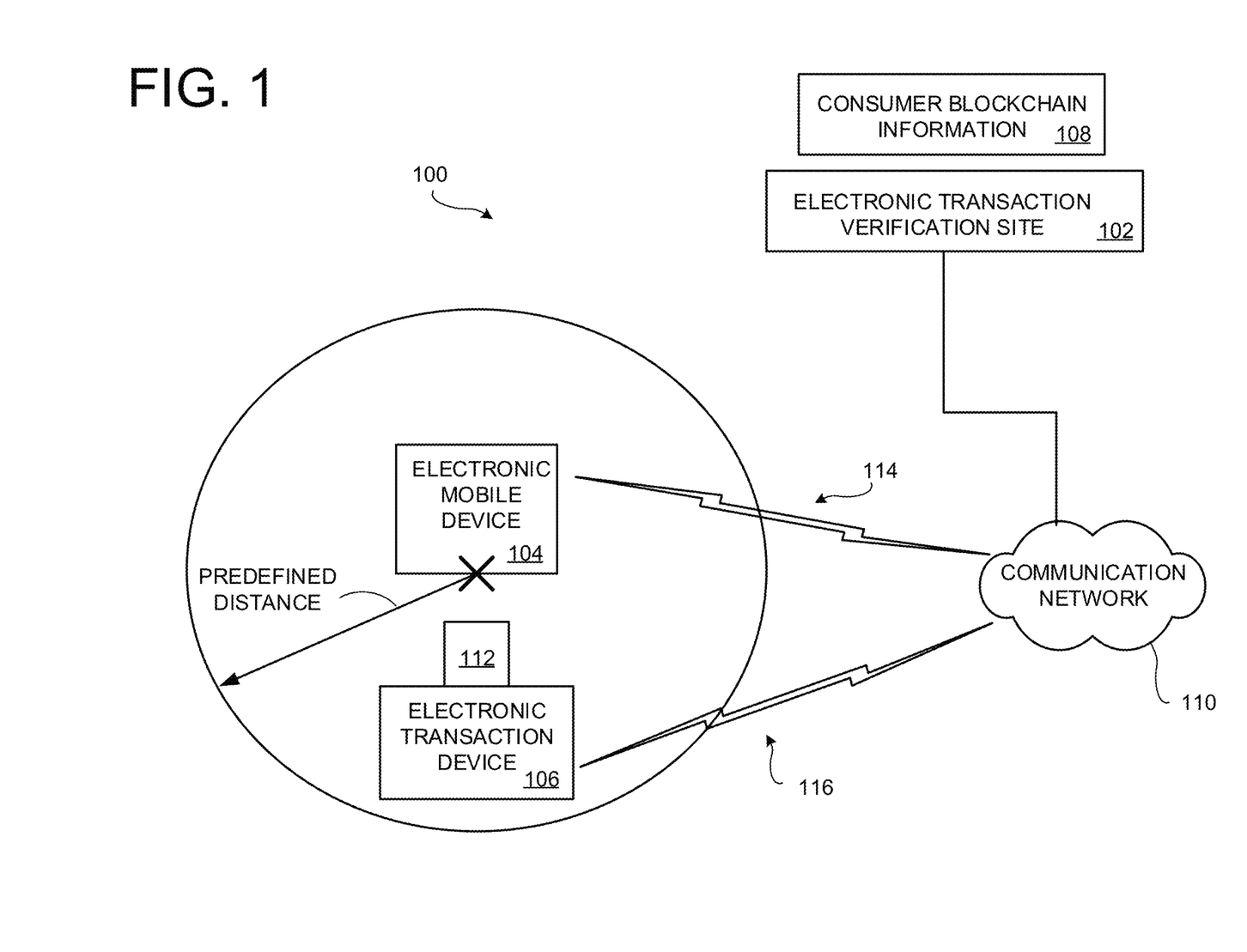
FIG. 1 is a block diagram of an embodiment of a transaction authorization system.

FIG. 1 is a block diagram of an embodiment of a transaction authorization system 100. The non-limiting illustrated embodiment of the transaction authorization system 100 comprises at least one electronic transaction verification system 102 that is in communication with a electronic mobile device 104 that is presumably in the personal possession of a consumer conducting an electronic transaction and that is in communication with an electronic transaction device 106.

The electronic transaction verification system 102 manages consumer blockchain information 108 that is uniquely associated with the consumer who is conducting the electronic transaction. The blockchain information 108 is conceptually illustrated as residing in a single block. One skilled in the art understands that in practice, the consumer blockchain information 108 resides in a distributed system of other electronic devices that are communicatively coupled to the electronic transaction verification system 102 via the communication network 110. When a transaction verification and authorization process is underway, the electronic transaction verification system 102 accesses these distributed locations so that the particular consumer information residing in the consumer blockchain information 108 may be accessed and used for transaction verification and authorization.

Further, the electronic transaction verification system 102, during any particular electronic transaction, manages the verification process whereby an ongoing electronic transaction is verified and/or is authorized for the consumer. In practice, the electronic transaction verification system 102 manages consumer blockchain information for thousands of, or more, individual consumer. Embodiments of the transaction authorization system 100 has the capability of concurrently managing the transaction verification and authorization process for thousands of, or more, electronic transactions.

The electronic transaction verification system 102 and the consumer's electronic mobile device 104 are communicatively coupled together via the communication system 110. The electronic transaction device 106 is also communicatively coupled to the electronic transaction verification system 102. Here, there is no need for the electronic transaction device 106 to be communicatively coupled to the electronic mobile device 104. Further, if the consumer is using an optional transaction device 112, such as an ATM card or the like, to facilitate the electronic transaction, the transaction device 112 does not need to be communicatively coupled to the consumer's electronic mobile device 104 or to the electronic transaction verification system 102 for completion of the transaction verification and authorization process. Such embodiments are inherently less complicated in architecture and/or operation and may be implemented at a lower cost.

During a transaction, location information defining the location of the electronic mobile device 104 is determined and is communicated to the electronic transaction verification system 102. Also, location information defining the location of the electronic transaction device 106 is determined and is communicated to the electronic transaction verification system 102. Alternatively, or additionally, identity information that identifies the electronic transaction device 106 may be used to access a database wherein the location information of the electronic transaction device 106 may be accessed and then provided to the electronic transaction verification system 102.

Once the locations of the electronic mobile device 104 and the electronic transaction device 106 are determined, the electronic transaction verification system 102 determines a distance between the electronic mobile device 104 and the electronic transaction device 106. The electronic transaction verification system 102 then compares the determined distance between the electronic mobile device 104 and the electronic transaction device 106 with a predefined distance, interchangeably referred to herein as a secured zone. If the determined distance between the electronic mobile device 104 and the electronic transaction device 106 is less than or equal to the predefined distance, then some embodiments of the transaction authorization system 100 determine that the electronic transaction may be verified and/or authorized. In some embodiments, if the transaction authorization system 100 determines that that the determined distance is not less than or equal to the predefined distance, then transaction authorization may be withheld, may be delayed, and/or may be conditional upon an explicit authorization from the consumer.

The location of the electronic mobile device 104 may be monitored on a real time basis. Accordingly, as the consumer moves from one location to another, the secured zone effectively moves along with the changing location of the consumer and is thus dynamic.

The predefined distance, in some embodiments, is securely stored as part of the consumer blockchain information 108. During the transaction verification and authorization process, the electronic transaction verification system 102 accesses this secure predefined distance. In some embodiments, the consumer has to authorize the electronic transaction verification system 102 to access the predefined distance from their secure consumer blockchain information 108 during the electronic transaction.

FIG. 1 illustrates that the electronic mobile device 104 is in communication with (is communicatively coupled to) the communication network 110 via a wireless signal 114. For example, the electronic mobile device 104 may be communicatively coupled to a cell tower of a wireless system. As another non-limiting example, the electronic mobile device 104 may be communicatively coupled to a Wi-fi node that is part of the communication network 110. In other situations, the electronic mobile device 104 may be communicatively coupled to the communication network 110 via a wire-based connector, such as when the electronic mobile device 104 is a personal computer, laptop device, personal assistant or the like where the consumer is using the wire connector to connect their electronic mobile device 104 to the communication network 110.

FIG. 1 further illustrates that the electronic transaction device 106 is in communication with (is communicatively coupled to) the communication network 110 via a wireless signal 116. In other situations, the electronic transaction device 106 may be communicatively coupled to the communication network 110 via a wire-based connector, such as when the electronic transaction device 106 is part of a networked system that is managed and controlled by a financial institution or other institution.

The communication network 110 is illustrated as a generic communication system. In one embodiment, the communication network 110 comprises a cellular telephone system, such as a radio frequency (RF) wireless system. Accordingly, the electronic mobile device 104 and/or the electronic transaction device 106 includes a suitable transceiver. Alternatively, the communication network 110 may be a telephony system, the Internet, a Wi-fi system, a microwave communication system, a fiber optics system, an intranet system, a local access network (LAN) system, an Ethernet system, a cable system, a radio frequency system, a cellular system, an infrared system, a satellite system, or a hybrid system comprised of multiple types of communication media. Additionally, embodiments of the transaction authorization system 100 may be implemented using other types of communication technologies, such as but not limited to, digital subscriber loop (DSL), X.25, Internet Protocol (IP), Ethernet, Integrated Services Digital Network (ISDN) and asynchronous transfer mode (ATM). Also, embodiments of the transaction authorization system 100 may be configured to communicate over combination systems having a plurality of segments which employ different formats for each segment that employ different technologies on each segment.

In operation, the consumer initiates an electronic transaction at the electronic transaction device 106. The electronic transaction device 106 communicates with the electronic transaction verification system 102 to initiate the transaction verification and authorization process. Alternatively, or additionally, the transaction verification and authorization process may be initiated by the consumer who uses their electronic mobile device 104 to start the electronic transaction.

Then, in an example embodiment, the electronic transaction verification system 102 is provided and/or obtains location information that defines the location of the electronic transaction device 106, and therefore that defines the location of the ongoing electronic transaction. Then, the electronic transaction verification system 102 accesses or obtains current location information (in real time or near-real time) for the consumer's electronic mobile device 104. Presumably, the consumer is in the immediate vicinity of and/or is in possession of their electronic mobile device 104. If the determined distance between the electronic mobile device 104 and the electronic transaction device 106 is within the predefined distance, then embodiments of the transaction authorization system 100 may infer that the consumer is the authorized person who is conducting the ongoing electronic transaction. Therefore, the electronic transaction may then be permitted to go to completion by the transaction authorization system 100.

On the other hand, if the determined distance between the electronic mobile device 104 and the electronic transaction device 106 is greater than the predefined distance, then embodiments of the transaction authorization system 100 may infer that the consumer is not the person who is conducting the ongoing electronic transaction. That is, embodiments may infer that a fraudulent individual is attempting to conduct the electronic transaction. Therefore, the electronic transaction may then be prevented from going to completion by the transaction authorization system 100.

In the various embodiments, the consumer has the ability to control the value of the predefined distance that is used during the transaction verification and authorization process. The user may specify this value, in any suitable metric, prior to the initiation of the electronic transaction. The user-defined predefined distance may be expressed as a radius distance. Here, the distance between a determinable location of the electronic transaction device 106 and the electronic mobile device 104 is readily comparable to a radius distance value.

In some embodiments, the consumer is permitted to enable or disable operation of the transaction authorization system 100. Alternatively, or additionally, the consumer may be allowed to activate or deactivate the security zone. Here, the transaction verification and authorization process may be based on other or additional information, such as the secure information residing in the consumer blockchain information 108.

Alternatively, or additionally, the predefined distance may be specified by any authorized third party. For example, a particular predefined distance may be specified by a credit card company for credit card-based electronic transactions. Here, if the consumer is using their credit card for an electronic transaction, the predefined distance specified by the credit card company is used during the transaction verification and authorization process. If another type of financial instrument is used by the consumer, a different predefined distance is used for the transaction verification and authorization process.

Alternatively, or additionally, other geometry forms may be used define the predefined distance. For example, a square, an oval, or other geometric shape, or polygon may be used. An outline of a known structure, such as a shopping mall or other location where an electronic transaction is likely to occur, may be used. In some embodiments, a plurality of different predefined distances may be used, wherein one of a plurality of predefined distances is selected depending upon the particular situation of the electronic transaction. For example, but not limited to, a radius value may be used when the consumer is conducting the electronic transaction at an ATM device. In a situation where the consumer is at a shopping mall, the predefined distance defined by the extents of the shopping mall may be used to verify and authorize point of purchase transaction occurring within the shopping mall. Any suitable geometry that defines the predefined distance are contemplated by the various embodiments.

Figure 2:
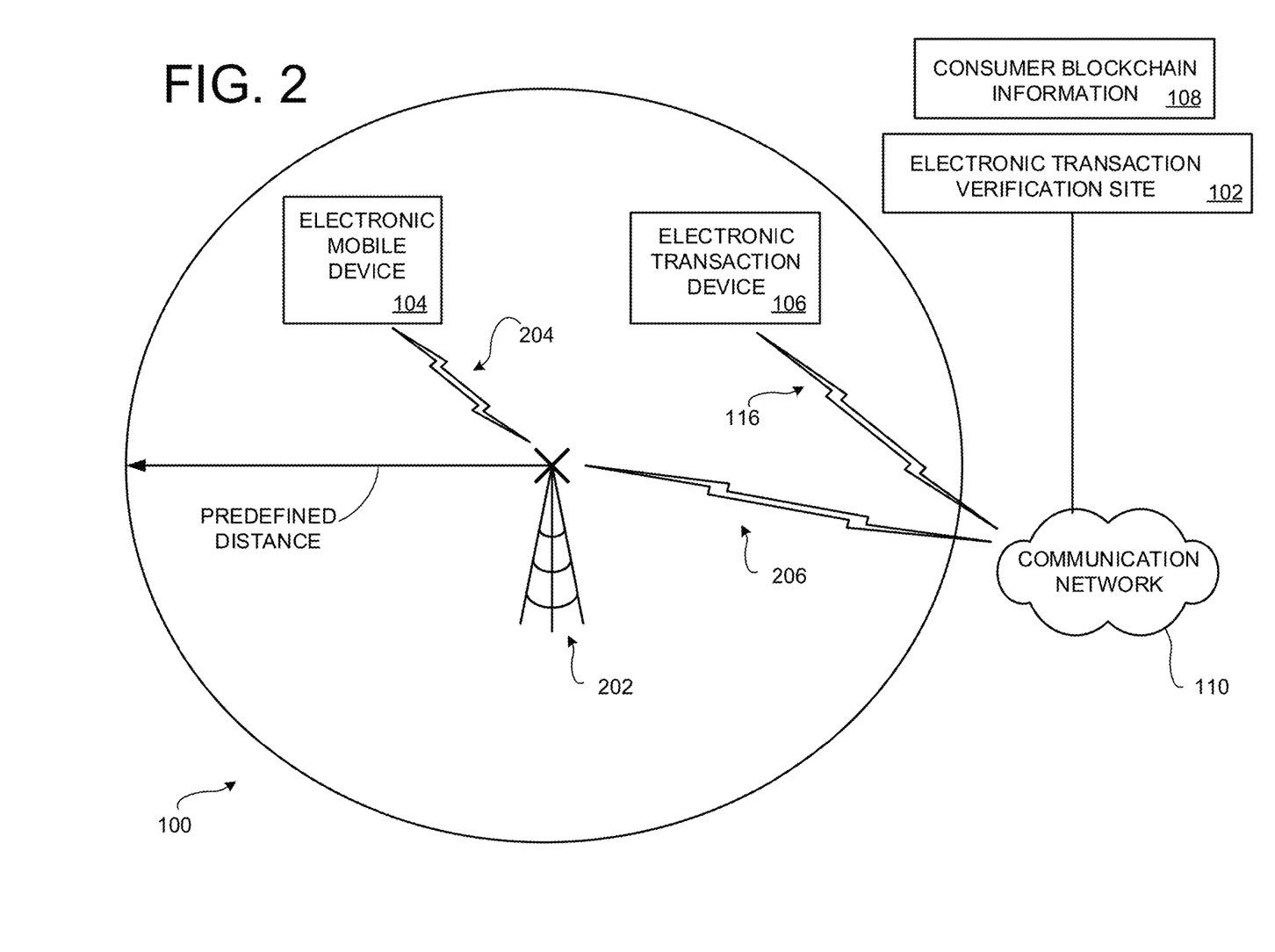
FIG. 2 is a block diagram of another embodiment of a transaction authorization system.

FIG. 2 is a block diagram of another embodiment of a transaction authorization system. One skilled in the art appreciates that the actual location of the consumer's electronic mobile device 104 may not be determinable or may not be determinable with any reliable degree of accuracy. However, the electronic mobile device 104 may be in communication with another intermediate device 202 wherein the location of that device is known and/or is determinable. For example, the electronic mobile device 104 may be wirelessly communicating with a cell phone tower, a Wi-fi node, or the like (the intermediate device 202) via wireless signal 204. The intermediate device 202 may then use a wireless signal 206 (or a wire-based connector) to communicatively couple the electronic mobile device 104 to the communication network 110.

Here, since the electronic mobile device 104 is communicatively coupled to the electronic transaction verification system 102 via the intermediate device 202, and since the location of the intermediate device 202 is known and/or may be determinable, the location of the intermediate device 202 may be used as a proxy location for the consumer and/or for the consumer's electronic mobile device 104 for the transaction verification and authorization process.

Further, in some embodiments, once the nature or characteristic of the intermediate device 202 is determined, a different predefined distance may be used to perform the transaction verification and authorization process. For example, the electronic mobile device 104 may be provisioned with a global positioning system (GPS) that can be used to precisely determine the location of the electronic mobile device 104. However, at times, the GPS system may be turned off, may be inactive, or may be inoperable. In such a situation, since the exact location of the electronic mobile device 104 cannot be obtained from the onboard GPS, then a proxy location can be determined from the location of the intermediate device 202. To illustrate, the consumer may be travelling in an automobile, an aircraft or other vehicle where determination of a location of the electronic mobile device 104 is not practical. The transaction may be occurring at an electronic transaction device 106 that is part of the vehicle. When then transaction authorization system 100 determines that the ongoing transaction is occurring, and that the location of the consumer is being approximated by the determined proxy location of the intermediate device 202, then a different predefined distance may be used for the transaction verification and authorization process. For example, if the intermediate device 202 is a cell tower, the predefined distance may need to be adjusted and enlarged as compared to situations where the location of the transaction authorization system 100 can be accurately determined. In the case of an aircraft, a relatively small predefined distance may be used as compared to the predefined distance that is used to verify and authenticate an ATM or point of purchase transaction since a reasonable inference may be made that the consumer is on board the aircraft. Conversely, if the consumer's electronic mobile device 104 does not have an operable GPS, a relatively large predefined distance may be used as compared to the predefined distance that is used to verify and authenticate an ATM or point of purchase transaction.

In some situations, the electronic transaction verification system 102 may be in communication with the electronic mobile device 104. The consumer may use a suitable secure interface to specify their current location as the proxy location for their electronic mobile device 104. Preferably, in such situations, additional levels of security and/or authorization (such as personal identification numbers, pins, passwords, and other forms for identity verification) are used to ensure that the user-specified proxy location is not being provided by a fraudulent individual.

Figure 3:
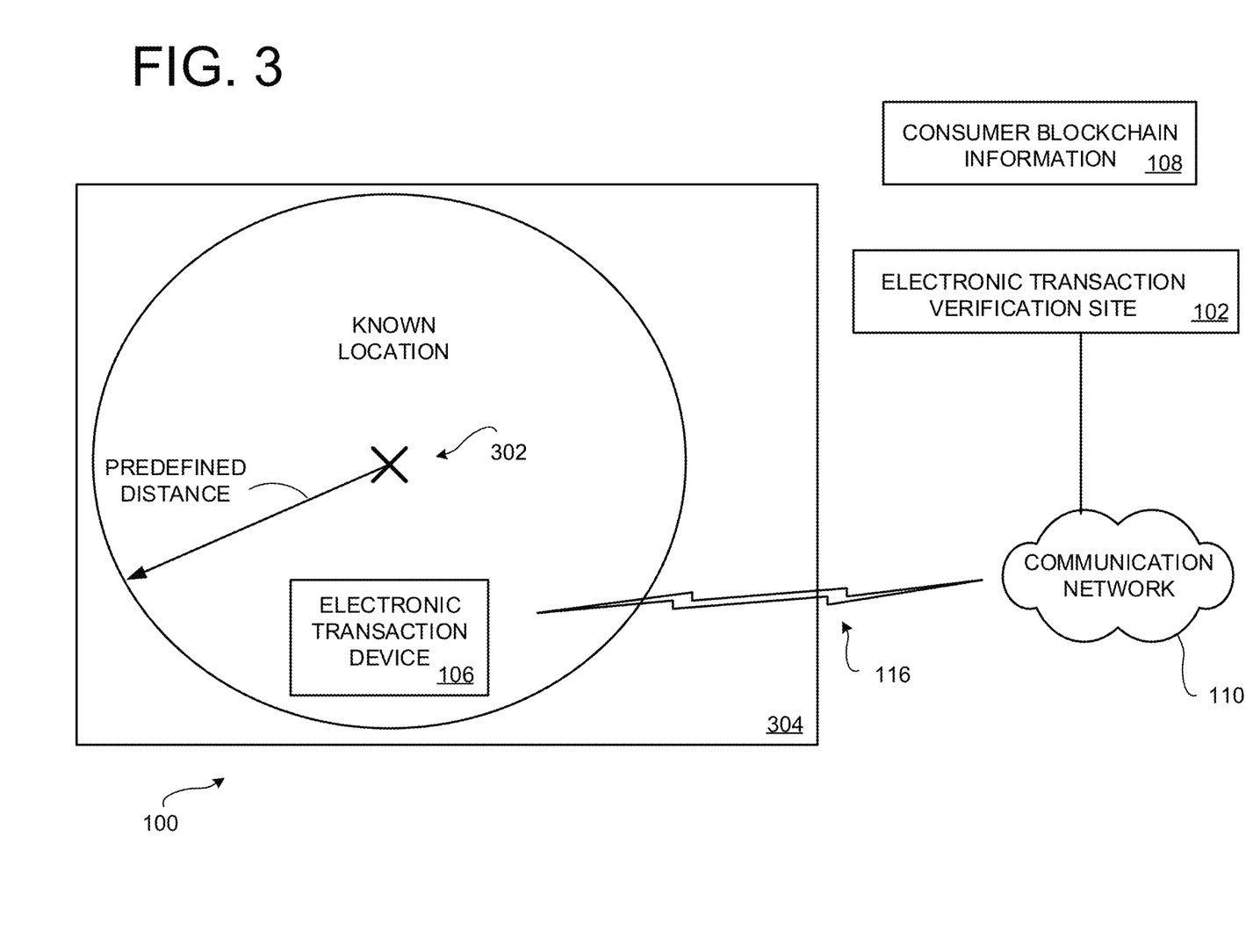
FIG. 3 is a block diagram of another embodiment of a transaction authorization system.

FIG. 3 is a block diagram of another embodiment of a transaction authorization system. In this example non-limiting embodiment, a known location is used as the proxy location for the transaction verification and authorization process. Here, the known location is compared with the determined location of the electronic transaction device 106. For example, the consumer may be at a shopping mall or other location, area, geographic region, or the like. To illustrate, the user may be attempting to obtain cash at an ATM, may be attempting to make a payment or obtain cash at a bank, and/or may be attempting to purchase a product or service at a store (interchangeably referred to herein in as a point of purchase transaction). As another example, the consumer may be at an event (such as a stadium, a farmer's market, or other venue) where a vendor is using a portable electronic transaction device 106 to conduct the electronic transaction.

Embodiments of the transaction authorization system 100 determine a location proximate to the ongoing electronic transaction that is associated with a known location 302. The known location 302 is associated with a predefined distance. The transaction verification and authorization process may then be performed based on the known location, the associated predefined distance, and the determined location of the electronic transaction device 106.

Figure 7:
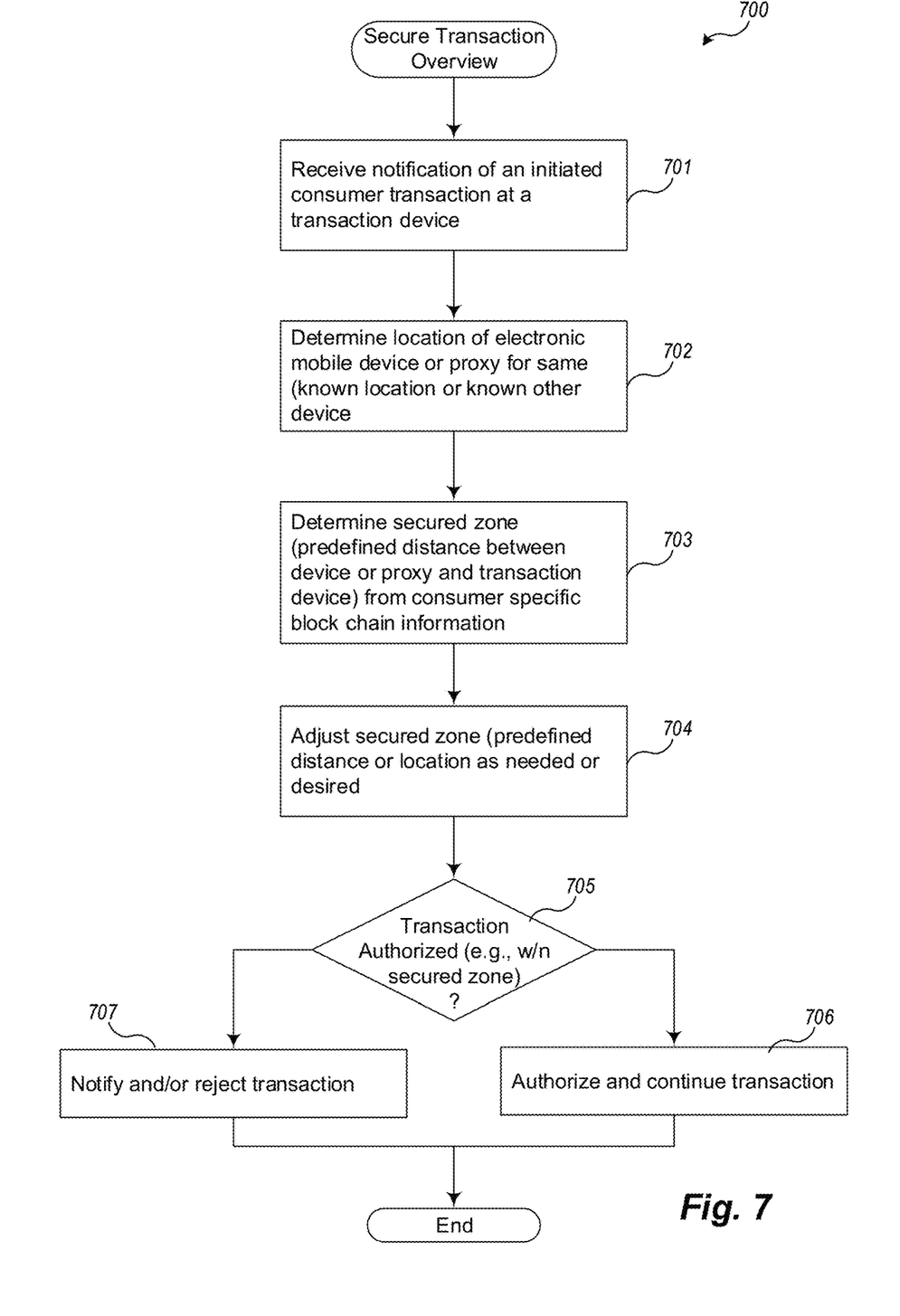
FIG. 7 is an example flow diagram of an overview of the logic described herein for conducting a transaction using secured zones as conducted by an electronic transaction verification system.

FIG. 7 is an example flow diagram of an overview of the logic described herein for conducting a transaction using secured zones as conducted by an electronic transaction verification system such as site 102 in FIG. 1. In block 701, the logic receives notification of an initiated consumer transaction such as initiated at electronic transaction device 106 or by the consumer's electronic mobile device 104. In block 702, the logic determines a location of the electronic mobile device or a proxy for this device if, for example, a location of the mobile device 104 is not accessible or cannot be determined accurately. This location may be a known location (such as a shopping mall) or an intermediate device location such as a cellular network tower.

In block 703, the logic of the transaction verification system determines a predefined distance between the device (or its proxy, including a known location) and the transaction device. In example embodiments, determining this predefined (consumer specific) distance is accomplished using block chain information that is specific and private to the consumer, i.e., secure, such as described in detail in U.S. patent application Ser. No. 16/660,759, filed Oct. 22, 2019, entitled "APPARATUS, SYSTEMS AND METHODS FOR STEMMED BLOCKCHAIN OPERATION WITH SECURED PARTICIPANT IDENTIFIERS," which is incorporated here by reference in its entirety. Other blockchain systems and protocols may be similarly incorporated.

In block 704, the secured zone (the predefined distance) may be modified by the consumer or by the transaction verification system. For example, the secured zone may be made smaller or enlarged based upon data such as the nature of the transaction device, the type of transaction, the location or nature or characteristic of the known location or intermediate device, and the like. In addition, the secured zone may be adjusted at other times such as "on demand" by the consumer, at set times, or by the transaction verification system itself.

In block 705 the logic determines whether the determined location of the device or its proxy is within the determined secured zone (the predefined distance). If so, the transaction is authorized in block 706. If not, the transaction is rejected in block 707, and the verification system may notify the consumer. Alternatively, the transaction may be "suspended" until the consumer is able to verify it by some alternative means.

In an example embodiment, the consumer may initiate a communication with the electronic transaction verification system 102 and specify their current location and/or specify the known location. For example, the consumer may indicate that they are in a particular venue such as a stadium. As another non-limiting example, the consumer may specify that they are currently in a particular city, town, or other identifiable region. The user-specified location may then be used for any occurring electronic transactions while the consumer is at or is nearby the user-specified location. Preferably, in such situations, additional levels of security and/or authorization (such as personal identification numbers, pins, passwords, or answers to particular questions) are used to ensure that the user-specified proxy location is not being provided by a fraudulent individual.

Alternatively, or additionally, information pertaining to past electronic transactions that have been previously verified and authorized is stored within the secure blockchain information 108. After some duration, embodiments of the transaction authorization system 100 may learn that the consumer is frequently located at a particular known location. One skilled in the art appreciates that there are likely to be a plurality of such known locations that the consumer frequents. Once the location of the electronic transaction device 106 is determined, the determined location of the electronic transaction device 106 can be compared with the plurality of known locations that the consumer is frequently at. Since the consumer blockchain information 108 is secure, it is not possible for a fraudulent individual access the secure consumer blockchain information 108 to learn about these known locations that are associated with the consumer.

As noted herein, the predefined distance may be represented using any suitable geometry. For example, if the known location 302 is associated with a building or other predefined region, the predefined distance may be represented using the geometry of the known location. For example, but not limited to, if the known location is a building that has one or more stores or is a field where a farmer's market in typically held, the predefined distance may be represented using a rectangle 304. Any suitable geometry may be used for the predefined distance that is associated with a known location.

Figure 4:
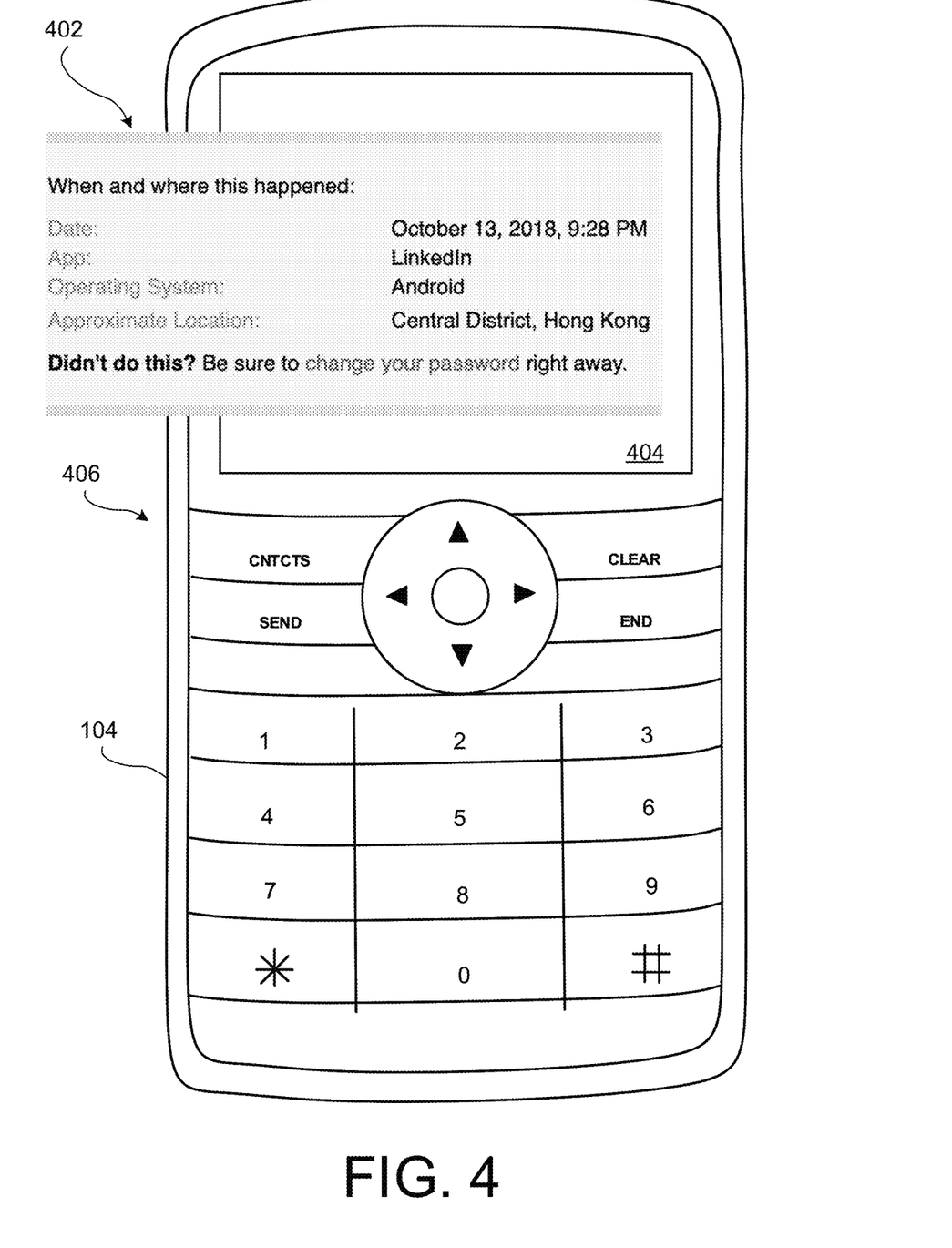
FIG. 4 is an example graphical user interface (GUI) that may be presented to the consumer during the transaction verification and authorization process.

FIG. 4 is an example graphical user interface (GUI) 402 that may be presented to the consumer during the transaction verification and authorization process. In this non-limiting example of an ongoing transaction verification and authorization process, the consumer receives a message from the electronic transaction verification system 102 that is presented on a display 404 of their electronic mobile device 104, here conceptually illustrated as the well-known cell phone or smart phone. The GUI 402 indicates that an electronic transaction is occurring, presents information about the transaction, and a provides a query requesting that the user authenticate the transaction and/or to take immediate security measures in the event that they are not conducting the electronic transaction. Any suitable GUI 402 that communicates information to the consumer during an ongoing electronic transaction is contemplated by the various embodiments.

In some embodiments, if a particular electronic transaction is denied by the transaction authorization system 100, an alarm or other suitable notification is sent to the consumer's electronic mobile device 104 or another device that is being used by or that is accessible to the consumer. Accordingly, the consumer may be informed that a potentially fraudulent electronic transaction has been denied, and that they should take corrective and/or precautionary actions to safeguard their property. Any suitable visual, haptic, and/or auditory warning or alarm may be generated and communicated to the consumer's electronic mobile device 104 or another suitable device. Further, the warning or alarm can be communicated to other entities, such as a bank or other financial intuitions, or even the consumer's spouse, friend or other close personal contact.

The GUI 402 is configured to permit the consumer to input any information back to the electronic transaction verification system 102 via actuation of one or more of the controllers 406 residing on the surface of the electronic mobile device 104. Any suitable GUI 402 that enables the consumer to input information during an ongoing electronic transaction is contemplated by the various embodiments. Some embodiments may require the consumer to input confidential and secret information that is known only to the consumer. Information corresponding to or matching with the input provided by the consumer may be securely stored in the consumer blockchain information 108. In response to receiving the information from the consumer, the electronic transaction may then be verified and/or authenticated, thereby permitting the electronic transaction to move to completion.

In the various embodiments, the electronic transaction device 106 was generically and conceptually described as a device that the consumer is interacting with or is using to conduct an electronic transaction. Embodiments of the transaction authorization system 100 are configured to facilitate electronic transactions with any electronic transaction device now known or later developed. Non-limiting example of electronic transaction devices 106 include automatic payment systems such as toll road collection points, an Internet of things (IoT) device, a credit card reader, a robot device, an artificial intelligence (AI) device, or even a web site. The various electronic transaction devices 106 may be stationary in a fixed location or may be mobile.

For example, the consumer may wish to make an electronic transaction for payment of a house mortgage or automobile payment to their local bank. In one instance, the consumer may go to the local bank and use one of their automated devices to conduct the electronic transaction payment. Since the consumer is in physical proximity of the bank's electronic transaction device 106, a relatively short first predefined distance may be used during the transaction verification and authorization process. On the other hand, the consumer may log onto a website of the local bank. Here, a proxy location of the bank website may be used, and a location of the consumer's personal computer (such as their home) may be used to determine the distance between the consumer and the bank's web site. Here, a greater second predefined distance, selected based on the known characteristics of the bank's electronic transaction device 106, here the internet web site, to conduct the transaction verification and authorization process. Enhanced security for such example electronic transactions is provided when various information used during the transaction verification and authorization process is securely stored in the consumer blockchain information 108 associated with that particular consumer.

In the various embodiments, any suitable currency type and/or currency denomination now known or later developed may be used. In some embodiments, the consumer may select which particular currency from a plurality of different currencies are to be used for all of, or a part of, the electronic transaction. For example, but not limited to, the transaction authorization system 100 may permit payment using bank funds available at a local or remote financial institution, foreign currency funds available at an overseas institution, an electronic payment system (such a PayPal or Google money), credit available from a financial organization (such as a credit card, home or personal equity line of credit, etc.) credits available from the vendor who is a participant in the electronic transaction, an electronic wallet or the like, or a form of crypto-currency, digital tokens, or the like.

Figure 5:
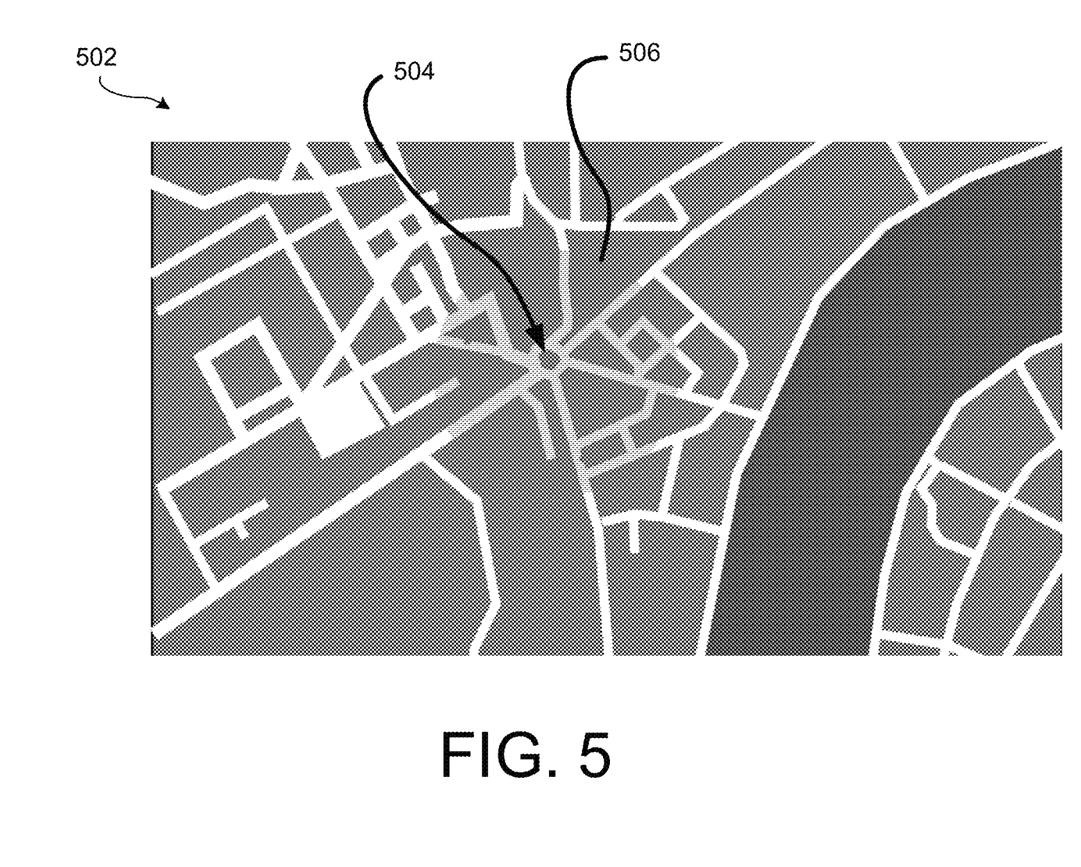
FIG. 5 is a map-based version of a presented GUI.

FIG. 5 is a map-based version of a presented GUI 502. In such embodiments, the GUI 502 may be presented as a map or other geographic based graphic. The map may show current location 504 of the electronic mobile device 104, a location of the electronic transaction device 106 being used for the electronic transaction (shown as a red dot in the center of the circular secure zone), locations of other potential electronic transaction device that are within the secure zone that might be used by the consumer to conduct an electronic transaction (shown as a red dot), and the predefined secure zone 506. Here, the consumer will intuitively understand the nature of the predefined distance relative to their electronic mobile device 104 and the electronic transaction device 106. In some situations, the map information may prompt the consumer to change the value of the predefined distance.

Figure 6:
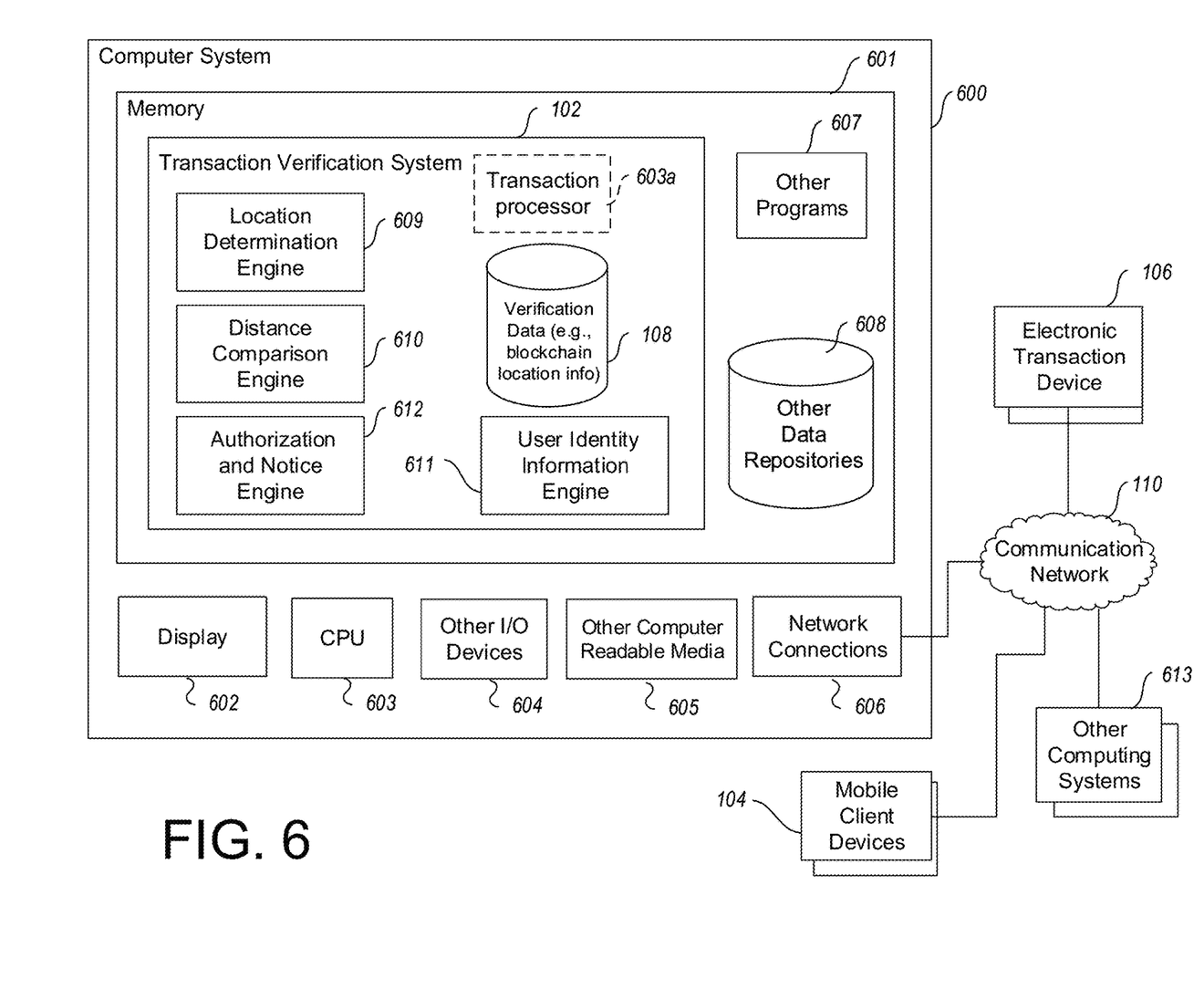
FIG. 6 is a block diagram of an example transaction authorization system.

FIG. 6 is an example block diagram of an example computing system that may be used to practice embodiments of a electronic transaction verification system 102 described herein. Note that one or more general purpose virtual or physical computing systems suitably instructed or a special purpose computing system may be used to implement an electronic transaction verification system 102. Further, the electronic transaction verification system 102 may be implemented in software, hardware, firmware, or in some combination to achieve the capabilities described herein.

Note that one or more general purpose or special purpose computing systems/devices may be used to implement the described techniques. However, just because it is possible to implement the electronic transaction verification system 102 on a general purpose computing system does not mean that the techniques themselves or the operations required to implement the techniques are conventional or well known.

The computing system 600 may comprise one or more server and/or client computing systems and may span distributed locations. In addition, each block shown may represent one or more such blocks as appropriate to a specific embodiment or may be combined with other blocks. Moreover, the various blocks of the transaction authorization system 100 may physically reside on one or more machines, which use standard (e.g., TCP/IP) or proprietary interprocess communication mechanisms to communicate with each other.

In the embodiment shown, computer system 600 comprises a computer memory ("memory") 601, a display 602, one or more Central Processing Units ("CPU") 603, Input/Output devices 604 (e.g., keyboard, mouse, CRT or LCD display, etc.), other computer-readable media 605, and one or more network connections 606. The consumer blockchain information 108 is shown residing in memory 601. In other embodiments, some portion of the contents, some of, or all of the components of the electronic transaction verification system 102 may be stored on and/or transmitted over the other computer-readable media 607. The components of the electronic transaction verification system 102 preferably execute on one or more CPUs 603 and manage the transaction verification and authorization process, as described herein. Other code or programs 607 and potentially other data repositories, such as data repository 608, also optionally reside in the memory 601, and preferably execute on one or more CPUs 603 (and/or processors 603*a*). Of note, one or more of the components in FIG. 6 may not be present in any specific implementation. For example, some embodiments embedded in other software may not provide means for user input or display.

In a typical embodiment, the electronic transaction verification system 102 includes one or more engines or components 609-612 that concurrently manage a plurality of ongoing electronic transactions for a plurality of different consumers. In some embodiments, multiple engines are available to manage various functions during a transaction verification and authorization process. An example engine is a location determination engine 609 that receives location information for the electronic mobile device 104 and/or the electronic transaction device 106 for the determination of the respective locations. A distance comparison engine 610 manages the comparison of the distance between the electronic mobile device 104 and the electronic transaction device 106 with the predefined distance. A user identity information engine 611 manages confirmation of a consumer's identification during the transaction verification and authorization process. An authorization and notice engine 612 manages the authorization process one a valid electronic transaction has been identified, and/or generation of notifications to the consumer, such as if the electronic transaction has been authorized or denied. Embodiments may include other engines not described herein that manage other operations pertaining to the transaction verification and authorization process and/or that pertain to other functions occurring at the electronic transaction verification system 102.

In at least some embodiments, the electronic transaction devices 106 are external to the electronic transaction verification system 102 and are available, potentially, over one or more networks 110. Other and/or different modules may be implemented. In addition, the electronic transaction verification system 102 may interact via the network 110 one or more third-party information provider systems 613, such as purveyors of information used in consumer blockchain information 108. Also, of note, the consumer blockchain information 108 may be provided external to the electronic transaction verification system 102 as well, for example in a distributed architecture at a plurality of devices or the like accessible over one or more networks 110.

In an example embodiment, components/modules of the electronic transaction verification system 102 are implemented using standard programming techniques. For example, the electronic transaction verification system 102 may be implemented as a "native" executable running on the CPU 603 (and/or the processor 603*a*), along with one or more static or dynamic libraries. In other embodiments, the electronic transaction verification system 102 may be implemented as instructions processed by a virtual machine. A range of programming languages known in the art may be employed for implementing such example embodiments, including representative implementations of various programming language paradigms, including but not limited to, object-oriented (e.g., Java, C++, C #, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use well-known or proprietary, synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously and communicate using message passing techniques. Equivalent synchronous embodiments are also supported. Also, other functions could be implemented and/or performed by each component/module, and in different orders, and in different components/modules, yet still achieve the described functions.

In addition, programming interfaces to the data stored as part of the electronic transaction verification system 102 (e.g., in the data repositories 108) can be available by standard mechanisms such as through C, C++, C #, and Java APIs; libraries for accessing files, databases, or other data repositories; through scripting languages such as XML; or through Web servers, FTP servers, or other types of servers providing access to stored data. The electronic transaction verification system 102 may be implemented as one or more database systems, file systems, or any other technique for storing such information, or any combination of the above, including implementations using distributed computing techniques.

Also, the example electronic transaction verification system 102 may be implemented in a distributed environment comprising multiple, even heterogeneous, computer systems and networks. Different configurations and locations of programs and data are contemplated for use with techniques of described herein. In addition, the electronic transaction verification system 102 may be physical or virtual computing systems and may reside on the same physical system. Also, one or more of the modules may themselves be distributed, pooled or otherwise grouped, such as for load balancing, reliability or security reasons (such as the blockchain information 108). A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, etc.) and the like. Other variations are possible. Also, other functionality could be provided by each component/module, or existing functionality could be distributed amongst the components/modules in different ways, yet still achieve the functions of the transaction verification system 102.

Furthermore, in some embodiments, some or all of the components of the electronic transaction verification system 102 may be implemented or provided in other manners, such as at least partially in firmware and/or hardware, including, but not limited to one or more application-specific integrated circuits (ASICs), standard integrated circuits, controllers executing appropriate instructions, and including microcontrollers and/or embedded controllers, field-programmable gate arrays (FPGAs), complex programmable logic devices (CPLDs), and the like. Some or all of the system components and/or data structures may also be stored as contents (e.g., as executable or other machine-readable software instructions or structured data) on a computer-readable medium (e.g., a hard disk; memory; network; other computer-readable medium; or other portable media article to be read by an appropriate drive or via an appropriate connection, such as a DVD or flash memory device) to enable the computer-readable medium to execute or otherwise use or provide the contents to perform at least some of the described techniques. Some or all of the components and/or data structures may be stored on tangible, non-transitory storage mediums. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

Exhibit I is an example business environment that utilizes one or more of the embodiments of the transaction authorization system 100. Embodiments of the transaction authorization system 100 are envisioned to be used by a limitless number of different types of transactional systems now known or later developed.

Exhibit II is a conceptual operational scenario of a non-limiting embodiment of the transaction authorization system 100. An image of a map-based GUI is conceptually illustrated in Exhibit II.

All of the above U.S. patents, U.S. patent application publications, U.S. patent applications, foreign patents, foreign patent applications and non-patent publications referred to in this specification and/or listed in the Application Data Sheet are incorporated herein by reference, in their entireties.

From the foregoing it will be appreciated that, although specific embodiments have been described herein for purposes of illustration, various modifications may be made without deviating from the spirit and scope of the invention. It should be emphasized that the above-described embodiments of the transaction authorization system 100 are merely possible examples of implementations of the invention. Many variations and modifications may be made to the above-described embodiments. All such modifications and variations are intended to be included herein within the scope of this disclosure and protected by the following claims. For example, the methods and systems for performing discussed herein are applicable to other architectures Also, the methods and systems discussed herein are applicable to differing protocols, communication media (optical, wireless, cable, etc.) and devices (such as wireless handsets, electronic organizers, personal digital assistants, portable email machines, game machines, pagers, navigation devices such as GPS receivers, etc.).

The invention claimed is:

1. A method in a transaction verification computing system for electronic transaction verification and authorization, the method comprising:
   automatically, and by a processor of the transaction verification computing system:
      receiving an indication of an initiated electronic transaction from an electronic transaction device having a physical location;
      determining a location of a personal electronic device of a consumer during the electronic transaction;
      determining a location of the electronic transaction device that is being used to conduct the electronic transaction;
      determining a distance between the personal electronic device of the consumer and the electronic transaction device;
      determining a first predefined distance that indicates a first secured zone from the personal electronic device to conduct electronic transactions by retrieving blockchain information that is uniquely associated with the consumer and not accessible by persons other than the consumer;
      comparing the determined distance with the first secured zone to automatically determine whether the determined distance is within the first secured zone; and
      when the comparison with the first secured zone indicates that the determined distance is within the first secured zone, automatically verifying and authorizing the electronic transaction;
      when the comparison with the first secured zone indicates that the determined distance is not within the first secured zone,
         determining a second predefined distance that indicates a second secured zone from the personal electronic device to conduct electronic transactions by retrieving second blockchain information that is uniquely associated with the consumer and not accessible by persons other than the consumer, wherein the second predefined distance indicates a predefined distance from a proxy for the physical location of the electronic transaction device determined by characteristics of the electronic transaction device;
         comparing the determined distance with the second secured zone to automatically determine whether the determined distance is within the second secured zone; and
         when the comparison with the second secured zone indicates that the determined distance is within the second secured zone, automatically verifying and authorizing the electronic transaction; and
      causing a graphical user interface of the personal electronic device to present on a display of the personal electronic device an indication of the first predefined distance for determining whether the transaction is authorized and to execute logic configured to allow the consumer to adjust the first predefined distance to a larger or smaller distance.

2. The method of claim 1 wherein the electronic transaction is verified when the determined distance is less than or equal to the first predefined distance.

3. The method of dam 1 wherein the location of the personal electronic device is determined from an intermediate device with a known location.

4. The method of claim 1 wherein the graphical user interface is a map and the predefined distance is displayed as a shape relative to an indication of the determined location of the electronic transaction device that the consumer is using to conduct the electronic transaction.

5. The method of claim 4 wherein the shape is at least one of a geometric shape, a polygon, or a building outline.

6. The method of claim 1 wherein the indication of an electronic transaction is received from the personal electronic device of the consumer or the electronic transaction device.

7. The method of claim 1, further comprising:
rejecting the electronic transaction when the determined distance is not within the first predefined distance and the second predefined distance.

8. The method of claim 7, further comprising:
receiving an indication of the adjusted first predefined distance; and
comparing the determined distance between the personal electronic device of the consumer and the electronic transaction device with the adjusted first predefined distance to determine whether the determined distance is within the adjusted first predefined distance.

9. A non-transitory computer readable memory medium in a transaction verification computing system containing instructions for controlling a computer processor when executed to perform a method for electronic transaction verification and authorization comprising:
automatically, and by the computer processor of the transaction verification computing system:
determining a location of a personal electronic device of a consumer during an initiated electronic transaction;
determining a location of an electronic transaction device that the consumer is using to conduct the initiated electronic transaction, the electronic transaction device having a physical location;
determining a distance between the personal electronic device of the consumer and the electronic transaction device;
determining a first predefined distance that indicates a first secured zone from the personal electronic device to conduct electronic transactions by retrieving blockchain information that is uniquely associated with the consumer and not accessible by persons other than the consumer;
comparing the determined distance with the first secured zone to automatically determine whether the determined distance is within the first secured zone;
when the comparison with the first secured zone indicates that the determined distance is within the first secured zone, automatically verifying and authorizing the initiated electronic transaction;
when the comparison with the first secured zone indicates that the determined distance is not within the first secured zone,
determining a second predefined distance that indicates a second secured zone from the personal electronic device to conduct electronic transactions by retrieving second blockchain information that is uniquely associated with the consumer and not accessible by persons other than the consumer, wherein the second predefined distance indicates a predefined distance from a proxy for the physical location of the electronic transaction device determined by characteristics of the electronic transaction device;
comparing the determined distance with the second secured zone to automatically determine whether the determined distance is within the second secured zone; and
when the comparison with the second secured zone indicates that the determined distance is within the second secured zone, automatically verifying and authorizing the electronic transaction;
when the comparison with the first secured zone and the comparison with the second secured zone indicate that the determined distance k neither within the first secured zone or the second secured zone, rejecting the initiated electronic transaction; and
causing a graphical user interface of the personal electronic device to present on a display of the personal electronic device an indication of the first predefined distance for determining whether the transaction is authorized and to execute logic configured to allow the consumer to adjust the first predefined distance to a larger or smaller distance.

10. An electronic transaction authorization system, comprising:
a block chain ledger system storing a block chain data structure and ledger of a first predefined distance unique to a consumer and a second predefined distance unique to the consumer; and
a transaction verification system having a processor which is configured to automatically determine whether a transaction is authorized by:
determining a physical location of a personal electronic device of the consumer during an initiated electronic transaction;
determining a physical location of an electronic transaction device being used to conduct an initiated electronic transaction;
determining a distance between the personal electronic device of the consumer and the electronic transaction device;
retrieving a first predefined distance from the block chain ledger system for the initiated electronic transaction;
comparing the determined distance between the personal electronic device and the electronic transaction device with the retrieved first predefined distance to assess whether the determined distance is within the first predefined distance;
when the comparison with the retrieved first predefined distance indicates that the determined distance is within the first predefined distance, automatically verifying and authorizing the initiated electronic transaction;
when the comparison with the retrieved first predefined distance indicates that the determined distance is not within the first predefined distance,
retrieving a second predefined distance from the block chain ledger system for the initiated electronic transaction, wherein the second predefined distance indicates a predefined distance from a proxy for the physical location of the electronic transaction device determined by characteristics of the electronic transaction device;
comparing the determined distance between the personal electronic device and the electronic transaction device with the retrieved second predefined distance to assess whether the determined distance is within the second predefined distance; and when the comparison with the retrieved second predefined distance indicates that the determined distance is within the second predefined distance, automatically verifying and authorizing the electronic transaction;

when the comparison with the first secured zone and the comparison with the second secured zone indicate that the determined distance is neither within the first secured zone or the second secured zone, rejecting the initiated electronic transaction; and a display of the personal electronic device an indication of the first predetermined distance for determining whether the transaction is authorized and to execute logic configured to allow the consumer to adjust the first predefined distance to a larger or smaller distance.

11. The system of claim 10 wherein the electronic transaction device is at least one of an automated teller system or a point of purchase device.

12. The system of claim 10 wherein the personal electronic device is a mobile device.

13. The system of claim 10, wherein the logic is further configured to display a graphical user interface to the consumer to facilitate adjusting the second predefined distance unique to the consumer.

14. The method of claim 1 wherein the characteristics of the electronic transaction device indicate that the electronic transaction device is a website.

15. The memory medium of claim 9 wherein the characteristics of the electronic transaction device indicate that the electronic transaction device is a website.

16. The system of claim 10 wherein characteristics of the electronic transaction device indicate that the electronic transaction device is a website.

* * * * *

UNITED STATES PATENT AND TRADEMARK OFFICE
CERTIFICATE OF CORRECTION

PATENT NO. : 11,049,106 B2
APPLICATION NO. : 16/721858
DATED : June 29, 2021
INVENTOR(S) : Frode van der Laak et al.

Page 1 of 1

It is certified that error appears in the above-identified patent and that said Letters Patent is hereby corrected as shown below:

In the Claims

In Column 14, Line 65 Claim 3, "dam" should read --claim--.

In Column 16, Line 11 Claim 9, "k" should read --is--.

Signed and Sealed this
Seventh Day of September, 2021

Drew Hirshfeld
*Performing the Functions and Duties of the
Under Secretary of Commerce for Intellectual Property and
Director of the United States Patent and Trademark Office*